Dec. 24, 1968  R. W. FLETCHER  3,418,172
METHOD OF MANUFACTURING A SMALL, BUTTON-TYPE ALKALINE
CELL HAVING A LOOSE, POWDERED ZINC ANODE
Filed June 29, 1965

United States Patent Office 3,418,172
Patented Dec. 24, 1968

3,418,172
METHOD OF MANUFACTURING A SMALL, BUTTON-TYPE ALKALINE CELL HAVING A LOOSE, POWDERED ZINC ANODE
Robert W. Fletcher, Mount Prospect, Ill., assignor to The Electric Storage Battery Company, a corporation of New Jersey
Filed June 29, 1965, Ser. No. 467,837
4 Claims. (Cl. 136—111)

ABSTRACT OF THE DISCLOSURE

A method of manufacturing a small, button-type alkaline cell comprising placing powdered zinc active material in a loose, uncompressed form into the anode container and thereafter adding the cell electrolyte in "two shots." A minor portion of the alkaline electrolyte is added directly to the loose zinc powder, and thereafter an absorbent separator is placed on the wetted zinc powder and the balance of the cell electrolyte is added to the absorbent separator. Alkaline cells made in this manner have zinc anodes of increased surface area which provides improved cell capacity and improved low temperature performance.

---

This invention relates to a method of manufacturing a small, button-type alkaline cell having a loose, powdered zinc anode. In particular, the invention relates to a method for making small alkaline cells having zinc anodes of increased surface area which more efficiently utilize the zinc active material.

In the primary battery art, many attempts have been made to improve cell performance by increasing the anode surface area and thereby providing for more complete utilization of the anodic material. The recent trend has been to form the anodes from powdered metals, such as zinc, which have a greater effective surface area than anodes of the same size prepared from flat or corrugated zinc sheet. Generally, the powdered metal particles are compressed to structurize the electrode. Another method for providing structural strength is to incorporate a binder such as a plastic resin in the anode active material particles. One of the disadvantages of these structurization methods is that the effective area of the powdered anode is reduced by the compression or the binder.

It is an object of this invention to provide a method of manufacturing a small, button-type alkaline cell having a loose, powdered zinc anode of increased surface area.

Another object of the invention is to provide an improved method of manufacturing small, button-type alkaline cells.

Other objects and advantages of this invention will be obvious to those skilled in the art in view of the following description, and in particular, by reference to the drawings in which.

It has been discovered that in the production of small, button-type alkaline cells, e.g. the 675 size used in hearing aids, it is not essential to structurize the powdered zinc anode active material such as by compressing it into a pellet or incorporating a plastic resin binder therein. In fact, the utilization of the powdered zinc is a loose, uncompressed form results in improved high rate capability and improved low temperature performance.

One of the problems encountered in using a loose, powdered zinc anode was the manufacture and assembly of the cell. It has been found that such a cell can be readily and efficiently manufactured by using a "two shot" electrolyte addition. A minor portion of the alkaline electrolyte required by the cell is added directly to the loose zinc powder which has been previously metered into the anode container. This provides the loose zinc powder with a minimal amount of structural strength, sufficient to withstand handling during subsequent assembly procedures. In addition, the electrolyte displaces air from the powdered zinc which helps to prevent the electrolyte from being carried out with entrapped air when the cell is closed.

After the initial electrolyte addition, an absorbent separator is placed on the wet zinc surface. The absorbent separator is retained in place on the anode for it tends to stick to the wet zinc surface. The separator absorbs electrolyte from the powdered zinc and becomes partially moistened. Thereafter, the major portion of the electrolyte, i.e. the balance of the cell requirement, is added directly to the separator. Since the separator has been previously moistened, the major portion of the electrolyte in the second addition is absorbed rapidly, does not require time to soak into the separator, and does not splash out of the anode container.

Figure 1:
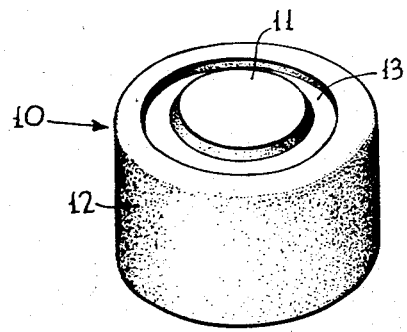
FIGURE 1 is a front elevation of a small, button-type alkaline cell.

A better understanding of this invention may be had by referring to the drawings. FIGURE 1 illustrates a typical small, button-type alkaline cell 10. The button cell 10 comprises an anode container 11, a cathode container 12 and an insulating grommet 13. The grommet is fitted over the edge of the anode container and electrically insulates it from the cathode container which is compressed or crimped upon the grommet to prevent electrolyte leakage.

Figure 2:
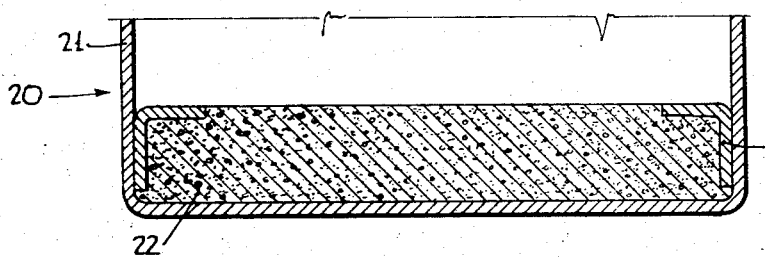
FIGURE 2 is a cross section of a small, button-type alkaline cell cathode.

A conventional, small, button-type alkaline cell cathode is shown in cross section in FIGURE 2. The cathode 20 comprises a cup-shaped cathode container 21 of steel or other suitable metal and a depolarizing cathode material 22 comprising an oxidizing compound such as mercuric oxide, manganese dioxide or silver oxide. The cathode material is compressed into a disc or pellet and is then inserted into the container with a retainer ring 23 placed over it to hold it in place.

Figure 3:
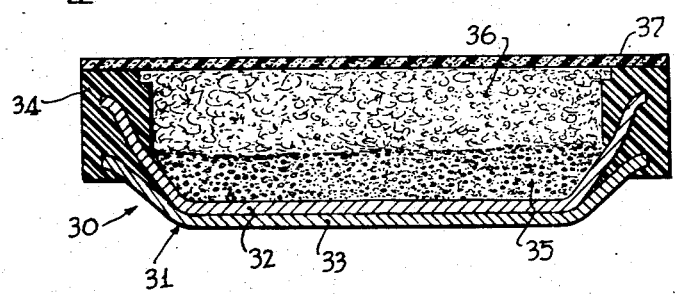
FIGURE 3 is a cross section of a small, button-type alkaline cell anode comprising loose, powdered zinc active material in accordance with this invention.

FIGURE 3 is a cross section of a small, button-type alkaline cell zinc anode made in accordance with this invention. Since the method of this invention is primarily concerned with the manufacture of a loose, powdered zinc anode, it will be described in detail with reference to FIGURE 3. The anode 30 comprises a double top container 31 whose inner container 32 is welded to the outer container 33. An insulating grommet 34 of a plastic resin material is placed over the double top container 31.

In accordance with the manufacturing procedures of this invention, the double top container-grommet assembly is degreased by washing it in a solvent such as trichloroethylene and air dried. The double top container-grommet assembly is inverted and placed in a handling tray. Then, zinc powder 35 is metered into the container. It is generally preferred that the zinc powder be amalgamated, with the mercury content ranging from about 1 to about 15% by weight. The zinc powder may then be leveled in the container by means of a leveling rod which is placed on the zinc powder but does not compress it. Thereafter, the whole assembly is vibrated to further insure that the zinc powder is level, with care being exercised not to spill the zinc powder during the vibration treatment.

After the zinc powder has been leveled, the first shot of conventional alkaline electrolyte (40% potassium hydroxide solution containing zinc oxide) is added directly to the zinc powder. This involves only a minor portion of the total amount of electrolyte to be added to the cell, and it is generally preferred to limit the initial electrolyte addition to from about 10 to about 30% by weight of the total electrolyte requirement. As a specific example, in a 675 size button-type alkaline cell, the zinc powder amounts to from about 0.25 to 0.28 gram, with the initial electrolyte addition ranging from about 0.035 to 0.045 gram, and the total electrolyte requirement amounts to about 0.15±0.005 gram.

After the zinc powder has been wetted with electrolyte, an electrolyte-resistant, highly absorbent separator 36 is place on the wet zinc. This separator material may be a nonwoven, matted cellulosic such as cotton fibers. The separator is slightly pressed onto the wet zinc powder, adheres thereto, and absorbs a small portion of the electrolyte from the zinc. Then, the balance of the cell electrolyte is added directly to the separator. Since the separator becomes partially moistened by the wet zinc powder, the major portion of the electrolyte which is added to the separator is rapidly absorbed and does not require time to soak into the separator. This prevents electrolyte from splashing out which sometimes occurs when all of the cell electrolyte is added to a dry separator. After the balance of the electrolyte has been added, a barrier 37 is placed on the wet separator. The barrier is a disc-shaped microporous material such as regenerated cellulose or a microporous plastic, e.g. polyvinyl chloride.

Figure 4:
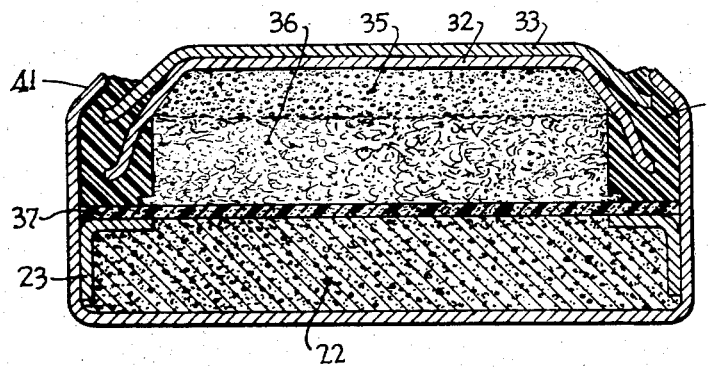
FIGURE 4 is a cross section view of a small, button-type alkaline cell having a loose, powdered zinc anode in accordance with this invention.

The assembly of the alkaline cell is completed by inverting the cathode assembly 20 and placing it on the anode 30, carefully avoiding disturbing the position of the barrier 37. The completed button-type alkaline cell is illustrated in FIGURE 4, wherein the various components are indicated by the same numerals used in FIGURES 2 and 3. The assembled cell is closed in a closing press by compressing the upper edge 41 of the cathode container 21 so that it is pressed tightly against the grommet 34.

The improved performance of button-type alkaline cells having a loose, powdered zinc anode manufactured in accordance with this invention is illustrated in the following example.

Example 1

Two button-type alkaline cells of the 675 size were prepared utilizing mercuric oxide as the cathode depolarizer material and amalgamated zinc powder as the anode material. One of the cells (control) had a compressed zinc powder anode and was manufactured in accordance with standard procedures. The other cell had a loose powdered zinc anode made in accordance with this invention. These cells were tested for their low temperature performance. The following results were obtained for a 300 ohm continuous discharge to a 0.90 volt endpoint at 25° F.

|  | Avg. voltage (v.) | Duration (hrs.) | Capacity (mah) |
|---|---|---|---|
| Control | 1.032 | 4.08 | 14.01 |
| Loose Zinc Anode | 1.067 | 24 | 85.4 |

The low temperature superiority of the loose zinc anode is apparent.

Having completely described this invention, what is claimed is:

1. A method of manufacturing a small, button-type alkaline cell which comprises placing loose zinc powder in an anode container, adding a minor portion of the total amount of alkaline electrolyte required by the cell directly to the powdered zinc, placing an electrolyte-resistant, highly absorbent separator on the wet zinc powder, adding the balance of the cell electrolyte to the separator, placing a microporous barrier on the wet separator, assembling said zinc anode with a conventional cathode assembly comprising a cathode container and cathode active material, and closing said anode-cathode assembly in such manner that the zinc particles are not compacted and are in loose but wetted form immediately after closing the assembly, whereby the surface area of the zinc powder after closing the assembly is substantially the same as the zinc powder surface area just prior to closing the assembly.

2. A method in accordance with claim 1 in which the loose zinc powder is leveled in the anode container prior to the addition of the minor portion of electrolyte to the zinc powder.

3. A method in accordance with claim 1 in which the minor portion of electrolyte added to the zinc powder comprises from about 10 to about 30% by weight of the total amount of electrolyte required by the cell.

4. A method in accordance with claim 1 in which the cathode active material is mercuric oxide, manganese dioxide or silver oxide.

References Cited

UNITED STATES PATENTS

| 2,480,839 | 9/1949 | Daniel | 136—126 |
| 2,606,941 | 8/1952 | Ruben | 136—111 |
| 3,015,681 | 1/1962 | Long | 136—111 |
| 3,193,412 | 7/1965 | Salkind et al. | 136—6 |
| 3,317,351 | 5/1967 | Honeycutt et al. | 136—83 |

WINSTON A. DOUGLAS, Primary Examiner.

A. SKAPARS, Assistant Examiner.

U.S. Cl. X.R.

136—126